April 7, 1936.  J. D. MURDOCK  2,036,820
PLOW ATTACHMENT
Filed Aug. 15, 1935
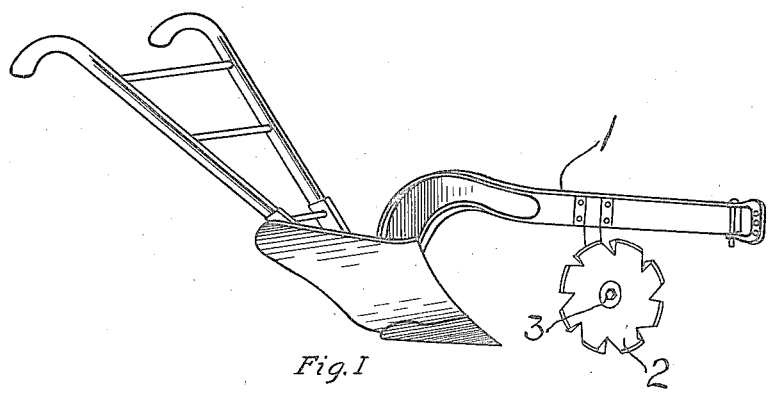
Fig. I
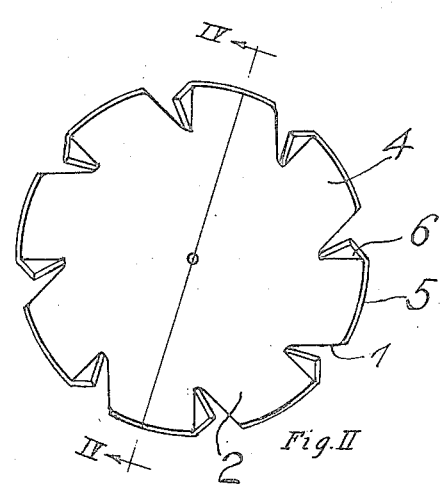
Fig. II
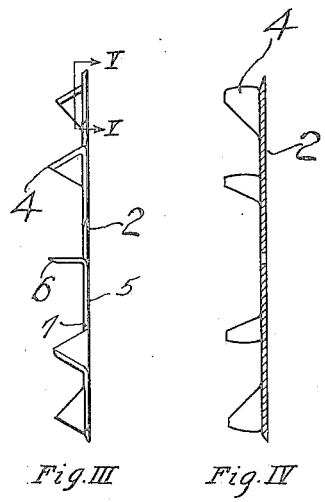
Fig. III     Fig. IV
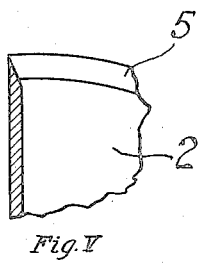
Fig. V
INVENTOR
James D. Murdock
BY
Samuel H. Davis
ATTORNEY Patented Apr. 7, 1936

2,036,820

UNITED STATES PATENT OFFICE 2,036,820

PLOW ATTACHMENT

James D. Murdock, East Lansing, Mich.

Application August 15, 1935, Serial No. 36,429

1 Claim. (Cl. 97—209)

This invention relates to attachments for plows, and has for its object the production of a rotating body having peripheral blades designed to cut or loosen the ground and sever the troublesome roots in front of the plow point to make it the easier for the plow to advance.

Unlike other blades of this nature, this invention is so specially constructed that it will force its way through debris or comparative hard substances rather than become clogged and estopped from rotating or cutting.

The object of this invention is also to produce an attachment for plows, which may be used on sulky plows or power plows, and which has a special construction and arrangement of parts found to effect superior results in use.

In the accompanying drawing, Fig. 1 represents a side view of an ordinary plow with this invention attached thereto.

Fig. 2 is a somewhat enlarged view of one face or side of the invention shown by itself.

Fig. 3 is an edge view showing the projecting blades.

Fig. 4 is a sectional view on the broken line 4—4 of the Fig. 2.

Fig. 5 is a fragmentary edge view of a portion of one of the blades.

Throughout the description and drawing the same number is used to refer to the same part.

A plow 1 has attached thereto a member constructed in accordance with this invention, and comprising a plate body portion 2, having means 3 by which the body may be connected to a plow beam in revoluble relation.

The body or central portion is provided with peripheral blades 4 and it will be noted in Fig. 2 that the blades are of substantially rectangular shape and that each blade has what may be termed an outer cutting edge 5 and a cutting edge 7 extending toward the body portion 2, and a right angle cutting edge 6 to blades 4.

In this invention it is not necessary to notch the periphery of the body portion. Instead of cutting out material to form notches, as, for example in United States Patent 674,658, this applicant instead of cutting out the material to form notches, makes a slit on one side and a crease on the other side, and then bends the piece of metal on the crease to form a triangular piece integral with the body. It will be noted in Figs. 1 and 2 that the slits from the peripheral edge of the disk are substantially parallel, and that they extend in a direction inclined to the radius of the disk. The triangular blades are formed by bending sidewise the angular parts of the edge of the disk included between one of the slits and the periphery of the disc. In the operation these triangular pieces act as diggers and pullers, so that the disk or plate body will not stop and slide because of debris piling up in front. Because of these pullers the disk or body is forced to revolve and it will thus cut its way through. All the material of the original circular disc is used. There is none of it cut away. It will be noted that the blades are located on one side of the rim of the body, to permit the effective action of the cutting edges of the blades. The blades and their edges may obviously be oppositely arranged from the form illustrated.

Having now described this invention, and the manner of its use, I claim:—

A plow attachment comprising a disk having integral triangular blades located at the rim of the disk and projecting sidewise of the disk, said disk having parallel slits extending from the periphery in a direction inclined to the radius of the disk whereby the edge portion of the disk is divided into sections having parallel side edges, the said angular blades extending between the meeting lines of said slits and the periphery of the disk, the said blades and sections having outer cutting edges, and each of said blades having a cutting edge extending inwardly towards the body of the disk.

JAMES D. MURDOCK.